United States Patent [19]

Kurz

[11] 4,227,087

[45] Oct. 7, 1980

[54] BEAM DETECTOR

[75] Inventor: Edward A. Kurz, Leicester, Mass.

[73] Assignee: Galileo Electro-Optics Corp., Sturbridge, Mass.

[21] Appl. No.: 40,734

[22] Filed: May 18, 1979

[51] Int. Cl.$^2$ .................... H01J 39/00; G01K 1/08

[52] U.S. Cl. .................................. 250/397; 250/305

[58] Field of Search .................. 250/397, 396 R, 305, 250/281, 282, 283; 313/361, 103 R, 103 CM

[56] References Cited

U.S. PATENT DOCUMENTS

| | | | |
|---|---|---|---|
| 3,180,986 | 4/1965 | Grigson | 250/305 |
| 3,679,896 | 7/1972 | Wardly | 250/305 |
| 4,126,781 | 11/1978 | Siegel | 250/305 |

OTHER PUBLICATIONS

"Continuous Dyanode Electron-Multipliers . . . Channeltrons, Data Sheet 4000B," Rev. No. 2, May 1978, Electro-Optics Corp. Publication.

*Primary Examiner*—Bruce C. Anderson

[57] ABSTRACT

An ion beam detector with a low-voltage, current-measuring lead connected to both a deflector and a multiplier anode and with the deflector and multiplier inlet so positioned as to deflect the beam into the inlet without the presence of a high positive voltage on the deflector.

10 Claims, 2 Drawing Figures

BEAM DETECTOR

FIELD OF THE INVENTION

This invention relates to ion detectors for mass spectrometers.

BACKGROUND OF THE INVENTION

In certain mass spectrometers, an electron multiplier detects an incoming beam of positive ions. The multiplier consists of a hollow glass tube coated on the inside with semiconductive material. When the ions impinge on the coating, they are converted into electrons, and the number of electrons is amplified by successive further collisions with the tube wall. The amplified number of electrons reaching the end of the tube generates a current at the output lead.

To reduce noise levels in the multiplier output caused by stray electrons and photons entering along with the positive ions, it is known to transversely displace the multiplier inlet from the trajectory of entering particles. The ions enter through an aperture in a positively-charged (e.g., +100 volts) plate. Beyond the plate is a deflector, electrically connected to the plate and thus also positively charged, and the multiplier inlet, which carries a high negative voltage (e.g., 1000 to 3500 volts). The ions are deflected toward the multiplier inlet by the electric field generated between the multiplier inlet and the plate and deflector. One such detector is the Galileo Channeltron Electron Multiplier Model 4772.

The same deflector has been used as a Faraday cup to measure the unamplified number of ions, such as for measuring the gain of the multiplier and for detecting unusually strong beams that would saturate the multiplier. In the Faraday-cup mode, the positive charge on the deflector and plate is removed to permit the ions to impinge thereon, and the current thereby generated is measured. The switchover between modes has conventionally required that a high-positive-voltage lead be removed from the deflector and plate and a current-measuring lead be substituted.

SUMMARY OF THE INVENTION

I have found that switchover from multiplier to Faraday-cup modes of operation can be simplified by connecting the low-voltage, current-measuring lead, presently connected only to the outlet of the multiplier, also to the deflector, as a replacement for the high-positive-voltage lead conventionally connected thereto, and by positioning the deflector and multiplier inlet so that the beam is deflected into the inlet without the presence of a positive voltage on the deflector. This allows the switchover to be accomplished by simply turning off the multiplier high voltage.

In preferred embodiments, the aperture plate is eliminated, thereby simplifying the detector; the inlet is positioned for properly deflecting the beam at the lowest multiplier voltage of interest (e.g., 1000 volts), thereby assuring that proper deflection will occur at higher voltages; the multiplier inlet and deflector are moved closer together to within 1.5 to 5.0 mm at their closest approach; the deflector is a U-shaped channel that surrounds the undeflected beam trajectory and the separation between the back of the channel and the multiplier inlet is from 5 to 10 mm; the channel side walls are shorter in the vicinity of the inlet, to accommodate the small separation between channel and multiplier inlet; the detector is adapted to be installed with the forward edge of the deflector separated from the outlet aperture of a mass spectrometer a distance of 1 to 5 mm; and the multiplier is a hollow glass tube with its inner wall coated with a layer of semiconductive material.

PREFERRED EMBODIMENT

The structure and operation of a preferred embodiment of the invention will now be described, after first briefly describing the drawings.

DRAWINGS

STRUCTURE

Figure 1:
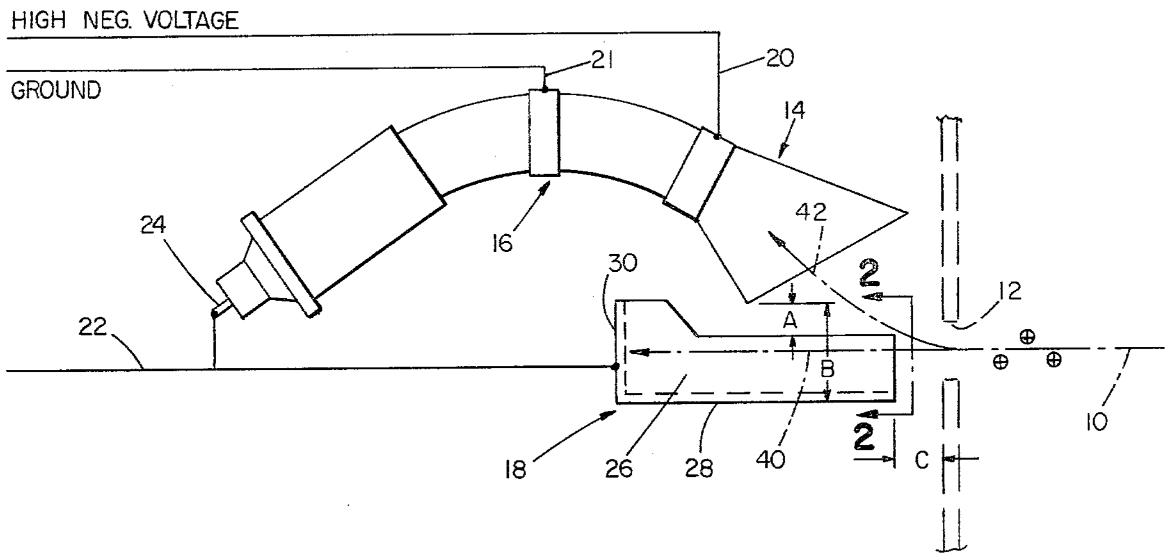
FIG. 1 is a diagrammatic view of said embodiment.

Referring to FIG. 1, beam 10 of positively-charged ions departing from a mass spectrometer through spectrometer aperture 12 (about 3 mm wide) is either deflected into inlet 14 of electron multiplier 16 or is allowed to impinge, without deflection, onto deflector 18. Multiplier 16 is a continuous dynode electron multiplier (Galileo Channeltron Model 4772) consisting of a hollow glass tube coated on its inner wall with a semiconductive material. A high negative voltage (e.g., above 1000 volts) is applied to the inlet 14 by lead 20. A ground 21 is applied to the outlet end of the multiplier. The electric field between the inlet and ground accelerates electrons along the interior of the tube. A current measuring output lead 22 is connected to multiplier outlet 24 and to the deflector 18. Outlet 24 is electrically isolated from the multiplier by a 0.080 inch gap.

Figure 2:
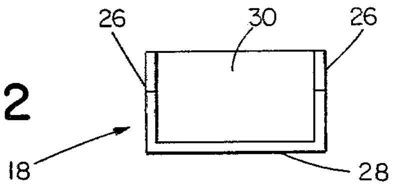
FIG. 2 is a view at 2—2 of FIG. 1.

As can be seen in FIG. 2, the deflector 18 is channel-shaped, having side walls 26, bottom 28, and back 30. Side walls 26 are shorter in the vicinity of multiplier inlet 14 and taller beyond the inlet, to allow the deflector and multiplier inlet to be moved close together about the undeflected beam trajectory 40. At their closest approach (dimension A), the deflector and inlet are 2 mm apart. The shorter side walls are 4 mm high, thus separating bottom 28 6 mm (dimension B) from inlet 14. When installed on the spectrometer, the most forward portions of the deflector and inlet are both about 2 mm (dimension C) from the spectrometer aperture plate when installed.

In prior art detectors, dimension A has been at least about 6 mm, and dimension B about 12 mm.

OPERATION

In normal operation, the ions are deflected into inlet 14 by the electric field generated between the high negative voltage at inlet 14 and the near zero voltage at deflector 18. The inlet is positioned so that ions will be properly deflected into the inlet at the lowest operating inlet voltage, about 1000 volts. At all higher operating voltages (e.g., up to 3500 volts), the ions are deflected more sharply and also enter the inlet. The ion density of the beam is determined by measuring the current produced, typically 3 to 4 microamperes, on output lead 22 connected to outlet 24.

The detector can also be operated without the multiplier, by turning off the high voltage on lead 20. In this mode, the deflector is referred to as a Faraday cup, and the beam impinges on deflector 18 without any deflection. The ion density is determined by measuring the current on output lead 22. This mode is useful for measuring the gain of the multiplier and for detecting high-density beams that would saturate the multiplier. No further adjustments are necessary than removing the high voltage on lead 20, as the current measuring lead 22 is permanently connected to the deflector.

Other embodiments of the invention are within the following claims. For example, dimension A, the minimum gap between deflector 18 and inlet 14, could be reduced to about 1.5 mm (any less would likely cause arcing between deflector and inlet) or enlarged to about 5 mm; dimension B, the distance between bottom 28 and inlet 14, could vary from 5 to 10 mm; and dimension C, the installed gap between spectrometer aperture 12 and the forward portions of inlet 14 and deflector 18, could vary from 1 to 5 mm.

What is claimed is:

1. In apparatus for detecting an ion beam, said apparatus including an electron multiplier, a deflector, a high-voltage lead for supplying a negative voltage to the inlet of said multiplier, and a low-voltage current-measuring lead connected to the outlet of said multiplier, said deflector lying along the undeflected trajectory of said beam and said inlet being displaced transversely from said trajectory, the improvement wherein:

said measuring lead is connected to said deflector and said deflector and multiplier inlet are positioned with respect to said beam such that said beam is deflected into said inlet by the electric field generated by said high negative voltage at said inlet, whereby said apparatus can conveniently be switched from an amplification mode in which said beam is deflected into said multiplier to a Faraday-cup mode in which said beam impinges on said deflector by only turning off said high-voltage lead, in both said modes the number of ions being measured as the current generated at said measuring lead which is common to both said multiplier outlet and deflector.

2. The apparatus of claim 1 wherein there is no positively-charged aperture plate forward of said deflector and multiplier.

3. The apparatus of claim 1 wherein said high-voltage applied to the inlet of said multiplier is variable upward from a low voltage and said deflector and inlet are positioned with respect to said beam such that the ions are deflected into the inlet at said low voltage, whereby the ions are also deflected into the inlet at higher voltages.

4. The apparatus of claim 1 wherein said multiplier inlet and deflector are separated at their closest approach by a gap of 1.5 to 5.0 mm and said high-voltage is above 1000 volts.

5. The apparatus of claim 4 wherein said deflector includes a U-shaped channel that surrounds said undeflected trajectory and the separation between the bottom of said channel and said multiplier inlet is from 5 to 10 mm.

6. The apparatus of claim 5 wherein said apparatus is adapted to be installed with the forward edge of the deflector separated from the outlet aperture of a mass spectrometer a distance of 1 to 5 mm.

7. The apparatus of claim 5 wherein the side walls of said channel are shorter in the vicinity of said inlet and taller beyond said inlet, whereby said inlet and deflector can be installed closer together.

8. The apparatus of claim 1 wherein said multiplier is a hollow glass tube with its inner wall coated with a layer of semiconductive material.

9. In the method of detecting an ion beam with apparatus including an electron multiplier, a deflector, a high-voltage lead for supplying a negative voltage to the inlet of said multiplier, and a low-voltage measuring lead for detecting the number of electrons at the outlet of said multiplier, said deflector lying along the undeflected trajectory of said beam and said inlet being displaced transversely from said trajectory, the improvement comprising the steps of:

connecting said low-voltage measuring lead to said deflector and said multiplier outlet, positioning said deflector and multiplier inlet with respect to said beam such that said beam can be deflected into said inlet by an electric field generated by applying a high negative voltage at said inlet, and measuring the current generated by said beam in a Faraday-cup mode, by applying zero voltage on said high-voltage lead so as to allow said beam to impinge on said deflector and measuring the current generated on said measuring lead.

10. In the method of detecting an ion beam with apparatus including an electron multiplier, a deflector, a high-voltage lead for supplying a negative voltage to the inlet of said multiplier, and a low-voltage measuring lead for detecting the number of electrons at the outlet of said multiplier, said deflector lying along the undeflected trajectory of said beam and said inet being displaced transversely from said trajectory, the improvement comprising the steps of:

connecting said low-voltage measuring lead to said deflector and said multiplier outlet, positioning said deflector and multiplier inlet with respect to said beam such that said beam can be deflected into said inlet by an electric field generated by applying a high negative voltage at said inlet, and measuring the current generated by said beam in an amplification mode, by applying said high negative voltage to said multiplier inlet to deflect said beam into said multiplier to amplify the intensity of said beam and measuring the current generated on said measuring lead.

* * * * *